United States Patent
Foltz et al.

(10) Patent No.: US 7,246,642 B2
(45) Date of Patent: Jul. 24, 2007

(54) BREAKAWAY CLOSURE FOR CAPLESS TANK FILLER NECK

(75) Inventors: Dean C. Foltz, Shelbyville, IN (US); Jason K. Jobe, Connersville, IN (US); Wallace D. Tallent, Greenfield, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 11/226,709

(22) Filed: Sep. 14, 2005

(65) Prior Publication Data

US 2006/0060581 A1 Mar. 23, 2006

Related U.S. Application Data

(60) Provisional application No. 60/610,670, filed on Sep. 17, 2004.

(51) Int. Cl.
*B65B 1/04* (2006.01)

(52) U.S. Cl. .......................... 141/350; 141/98; 141/285; 220/86.2

(58) Field of Classification Search ................ 141/98, 141/285, 302, 348–350; 220/86.2, 288, DIG. 33, 220/266
See application file for complete search history.

(56) References Cited

U.S. PATENT DOCUMENTS

| | | | |
|---|---|---|---|
| 4,177,931 A | 12/1979 | Evans | |
| 4,678,097 A * | 7/1987 | Crute | 220/288 |
| 4,830,058 A | 5/1989 | Harris | |
| 5,975,328 A * | 11/1999 | Hagano et al. | 220/288 |
| 6,179,148 B1 | 1/2001 | Harris | |
| 6,189,581 B1 | 2/2001 | Harris et al. | |
| 6,315,144 B1 | 11/2001 | Foltz | |
| 6,679,396 B1 | 1/2004 | Foltz et al. | |
| 6,691,750 B1 * | 2/2004 | Foltz | 141/350 |
| 6,755,057 B2 * | 6/2004 | Foltz | 70/159 |
| 6,923,224 B1 * | 8/2005 | McClung et al. | 141/350 |

FOREIGN PATENT DOCUMENTS

| | | |
|---|---|---|
| DE | 4106864 C1 | 5/1992 |
| DE | 20309800 U1 | 7/2004 |

* cited by examiner

*Primary Examiner*—Timothy L. Maust
(74) *Attorney, Agent, or Firm*—Barnes & Thornburg LLP

(57) ABSTRACT

A filler neck closure unit includes a frangible portion that is configured to break along a fracture line when an outer portion of the closure unit is hit by a strong blow. The closure unit includes an inner portion that remains coupled to a filler neck to block discharge of liquid fuel and fuel vapor from the filler neck and an outer portion that takes the blow and separates from the inner portion at the fracture line.

20 Claims, 4 Drawing Sheets

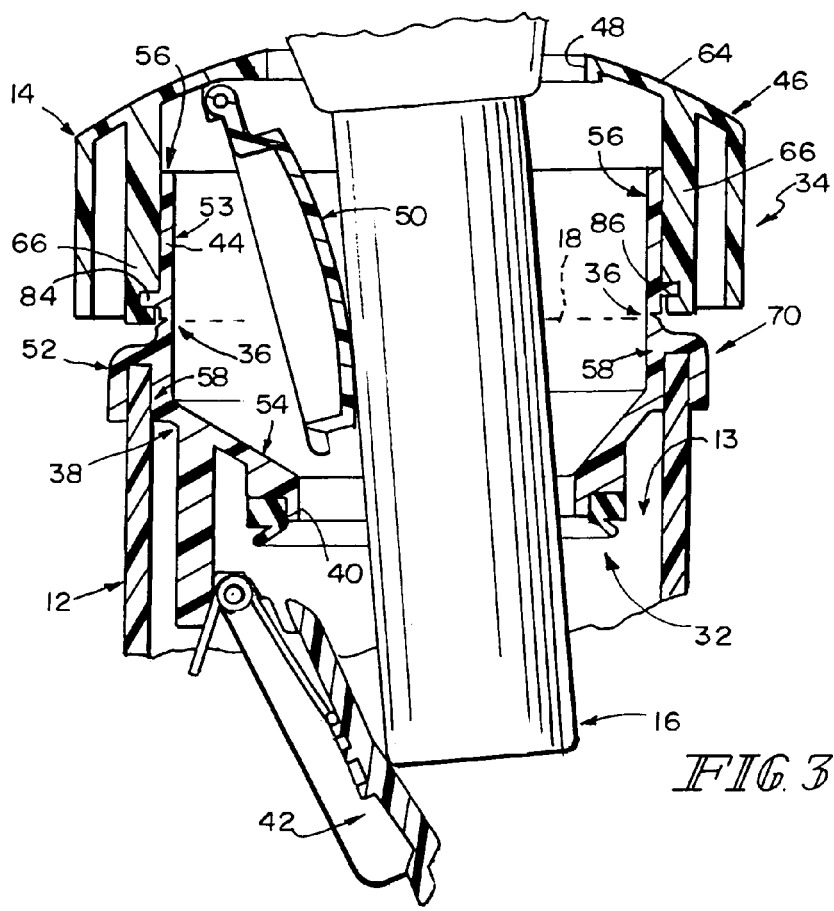
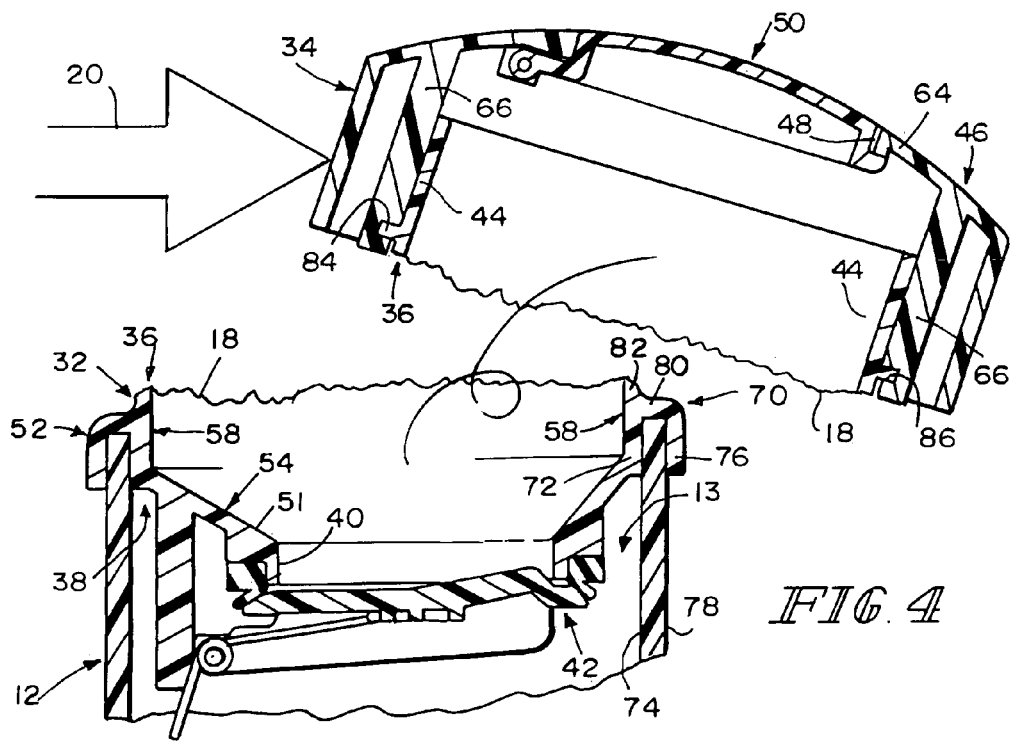

BREAKAWAY CLOSURE FOR CAPLESS TANK FILLER NECK

This application claims priority under 35 U.S.C. § 119(e) to U.S. Provisional Application Ser. No. 60/610,670, filed Sep. 17, 2004, which is expressly incorporated by reference herein.

BACKGROUND

The present disclosure generally relates to a filler neck closure assembly for a vehicle fuel tank, and particularly to a filler neck closure for use in a capless fuel tank filler neck. More particularly, the present disclosure relates to a breakaway closure for a capless tank filler neck.

U.S. Pat. No. 6,315,144 to Dean C. Foltz, entitled "Containment Cover for Tank filler Neck Closure" is hereby incorporated by reference herein. U.S. Pat. No. 1,978,314 to Lancaster and U.S. Pat. No. 2,054,145 to Tandy are also incorporated by reference herein.

A removable fuel cap with a sealing gasket typically is used to close the open end of a fuel tank filler neck. After an attendant fills the fuel tank and withdraws the pump nozzle from the filler neck, the fuel cap is attached to the filler neck so that the sealing gasket forms a seal between the fuel cap and the filler neck. Thus, the fuel cap closes the open end of the filler neck to block discharge of liquid fuel and fuel vapor from the fuel tank through the filler neck. Some fuel caps are provided with pressure-relief and vacuum-relief valves to permit some controlled venting of fuel vapors in the filler neck, while the fuel cap is mounted on the filler neck.

It has been observed that fuel caps are often lost or damaged over time and, as a result, the open end of the filler neck might not be closed and sealed in accordance with original equipment specifications during operation of the vehicle. Accordingly, a filler neck configured to "open" automatically as a fuel-dispensing pump nozzle is inserted into the filler neck during refueling and "close" automatically once the pump nozzle is withdrawn from the filler neck without requiring an attendant to reattach a fuel cap to the filler neck would be an improvement over many conventional capped filler neck systems. Although conventional fuel caps function to close filler necks in a satisfactory manner, it is thought that a capless filler neck could make vehicle refueling more convenient for consumers because no action other than inserting a pump nozzle into the outer end of the filler neck would be required to begin refueling a vehicle.

SUMMARY

According to the present disclosure, a capless filler neck closure unit is associated with a vehicle fuel tank filler neck. In illustrative embodiments, the closure unit is formed to include a frangible, breakaway groove that is configured to fracture when the closure unit is impacted by a strong force during a vehicle accident. Following such a fracture, an outer portion of the closure unit separates from an inner portion of the closure unit that is retained in a mounted position closing an outer end of the capless filler neck to block discharge of liquid fuel from the fuel tank through the outer end of the capless filler neck.

In illustrative embodiments, the outer portion of the closure unit includes a pivotable outer appearance door and the inner portion of the closure unit includes a pivotable inner flapper door. The inner flapper door is biased to a normally closed position to block discharge of fuel and fuel vapor from the filler neck. The inner flapper door remains in its normally closed position even after separation of the outer portion from the inner portion caused by fracture of the frangible, breakaway groove in the closure unit.

Also in illustrative embodiments, the closure unit includes grounded electrically conductive components. These components are arranged to "ground" a positively charged fuel-dispensing pump nozzle to dissipate an electrostatic charge associated with the pump nozzle once the pump nozzle contacts an exterior portion of the closure unit and before a sealed normally closed inner flapper door included in the closure unit is opened.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 3 is a sectional view similar to FIG. 2 showing the fuel-dispensing pump nozzle of FIG. 1 arranged to pivot the outer appearance door and the inner flapper door to opened positions to position the nozzle in the filler neck to allow fuel to be pumped through the nozzle into the fuel tank filler neck during vehicle refueling;

FIG. 4 is a sectional view similar to FIG. 2 after the base has been broken at the frangible, breakaway groove as a result of an impact to the external cover and showing separation of a "discardable" breakaway unit of the filler neck closure unit comprising the outer base portion and the external cover from a "retained" barrier unit of the filler neck closure unit comprising the inner base portion and the inner flapper door;

DETAILED DESCRIPTION

Figure 1:
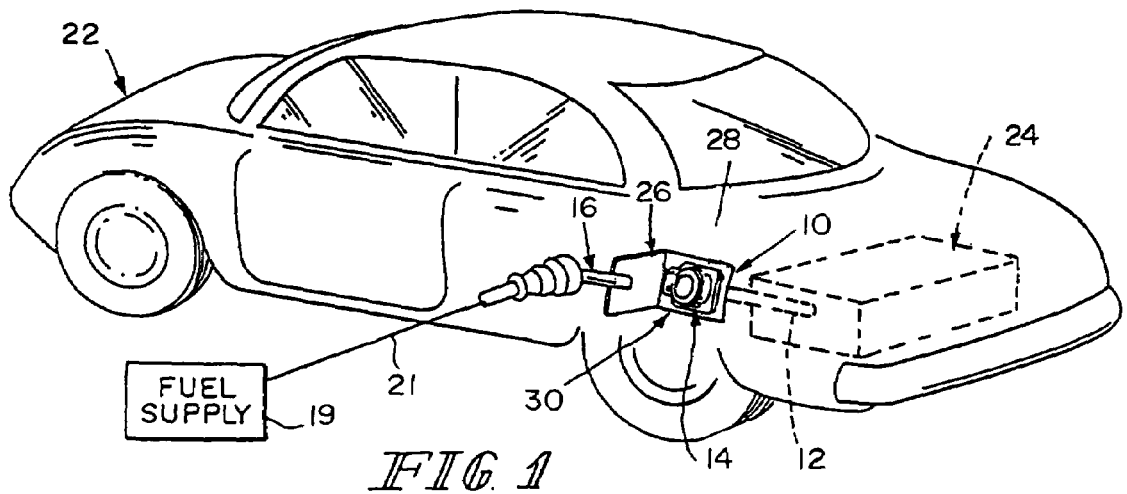
FIG. 1 is a perspective view of a vehicle showing an outer filler neck access door moved to an opened position relative to a vehicle body panel to expose a capless filler neck closure unit coupled to a filler neck (shown in phantom) and a fuel-dispensing pump nozzle arranged for insertion into the filler neck through the filler closure unit to dispense fuel into the filler neck and a fuel tank (shown in phantom) of the vehicle coupled to the filler neck.
Figure 6:
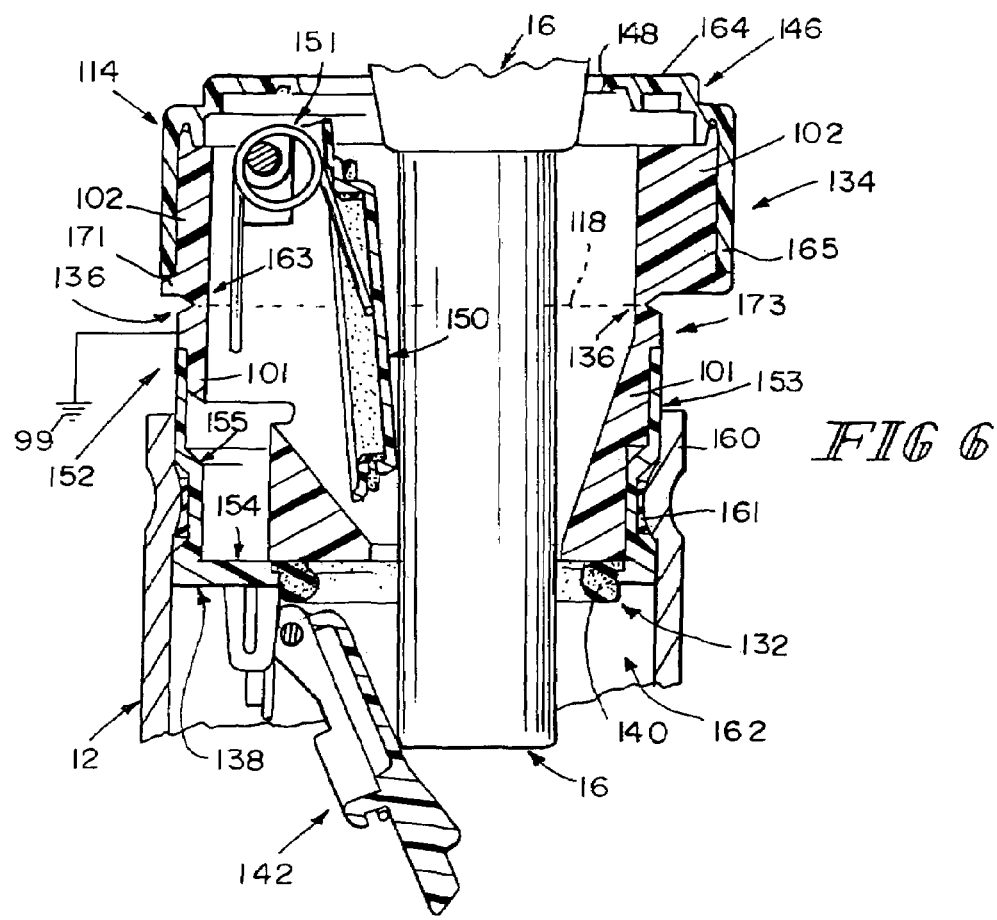
FIG. 6 is a sectional view similar to FIG. 5 showing contact of an initially positively charged fuel-dispensing pump nozzle against the pivotable outer appearance door to dissipate an electrostatic charge associated with the pump nozzle before the sealed inner flap door supported on the foundation of the base is opened.
Figure 7:
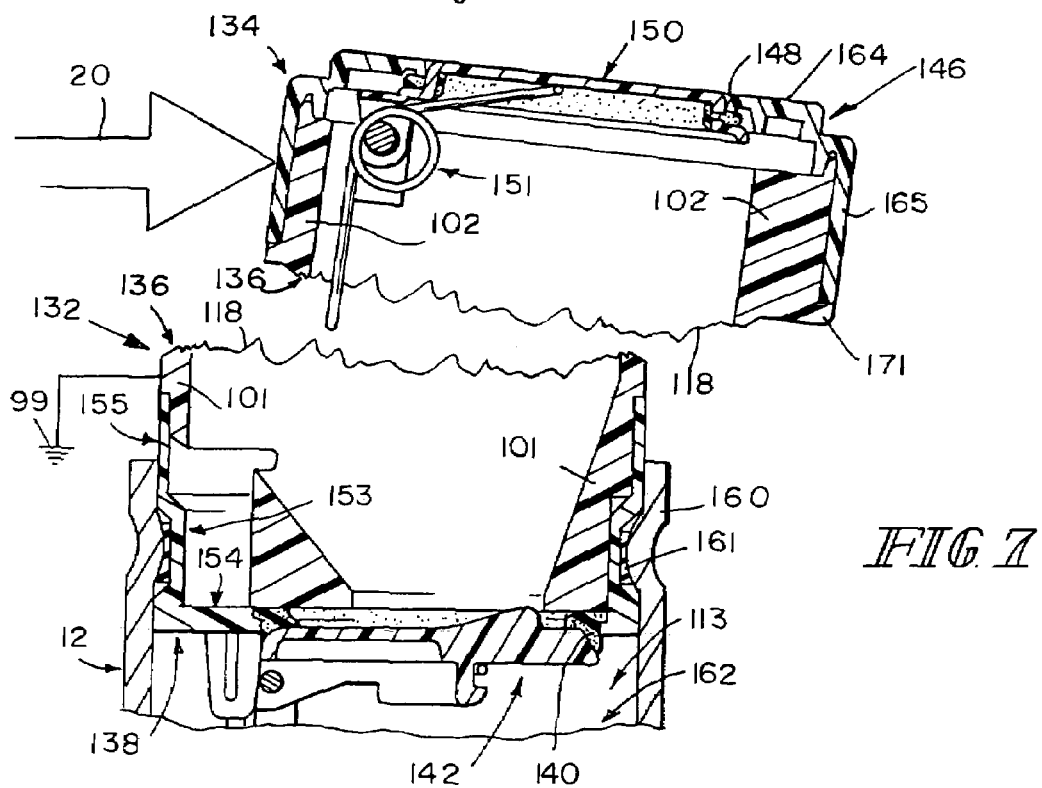
FIG. 7 is a sectional view similar to FIG. 5 after the sleeve has been broken at the frangible, breakaway groove as a result of an impact to the external cover and showing separation of a "discardable" breakaway unit of the filler neck closure unit comprising the outer end of the tube and the external cover from a "retained" barrier unit of the filler neck closure unit comprising the foundation, the inner flapper door, and the inner end of the tube.

A fuel tank filler apparatus 10 includes a fuel tank filler neck 12 and a capless filler neck closure unit 14 coupled to an outer end of filler neck 12 as suggested in FIG. 1. Closure unit 14 in accordance with a first embodiment of the present disclosure is configured to admit a fuel-dispensing pump nozzle 16 into filler neck 12 during a tank-refueling activity as suggested in FIGS. 2 and 3 and "fracture" in a controlled manner along an illustrative fracture line 18 in response to an external impact 20 as suggested in FIG. 4 to block unwanted discharge of liquid fuel or fuel vapor from filler neck 12 after impact 20. A closure unit 114 is provided with an illustrative fracture line 118 in accordance with a second embodiment of the present disclosure as shown in FIGS. 5-7.

As suggested in FIG. 1, a vehicle 22 includes a fuel tank 24 coupled to filler neck 12. Vehicle 22 includes an outer access door 26 that can be moved relative to vehicle body panel 28 to expose filler neck closure unit 14 carried on filler neck 12. Closure unit 14 is located in a chamber 30 formed in vehicle 22 so that closure unit 14 is "out of sight" when access door 26 is closed. Fuel-dispensing pump nozzle 16 is coupled to a fuel supply 19 by a hose 21 and is configured to be inserted into closure unit 14 during vehicle refueling to discharge liquid fuel into filler neck 12 during tank refueling activities.

Figure 2:
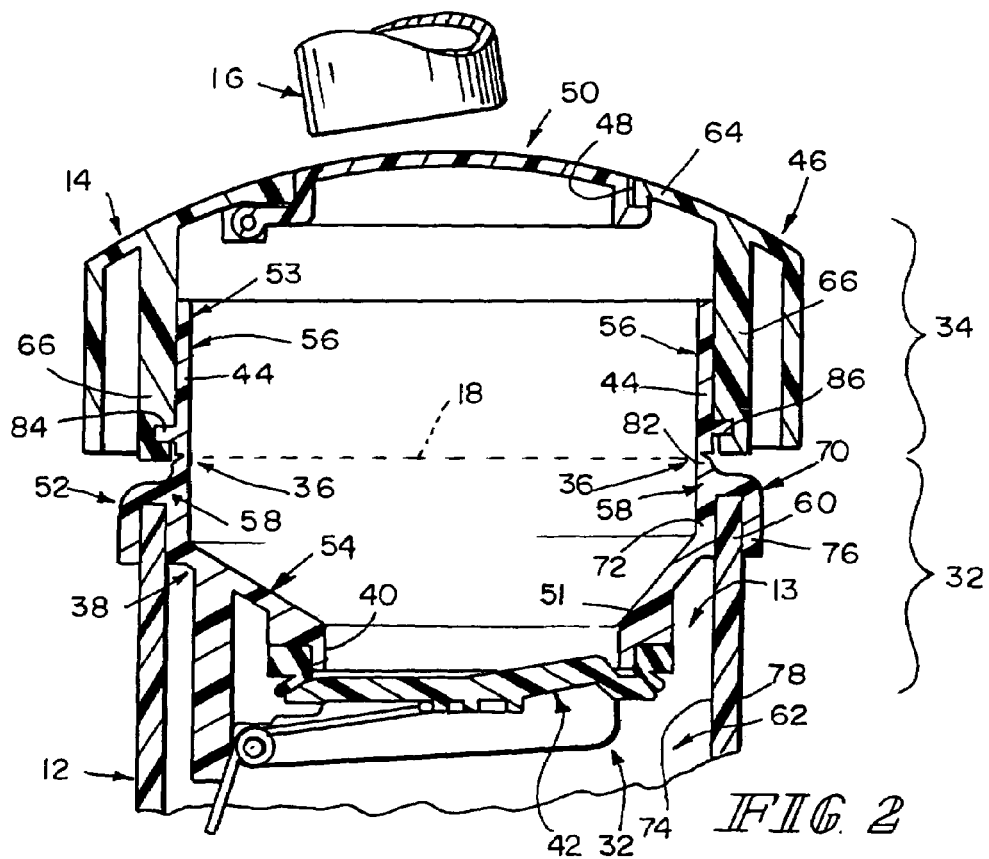
FIG. 2 is a sectional view of a capless filler neck closure unit in accordance with a first embodiment of the present disclosure, the capless filler neck closure unit including a base having an inner base portion coupled to an outer end of the filler neck and configured to support a pivotable inner flapper door normally closing a nozzle-receiving opening formed in the inner base portion and an outer base portion joined to the inner base portion at a frangible breakaway groove formed in the base, the filler neck closure unit further including an external cover having an internal sleeve coupled to the outer base portion and configured to support a pivotable outer appearance door normally closing a nozzle-receiving opening formed in a top wall of the cover.
Figure 5:
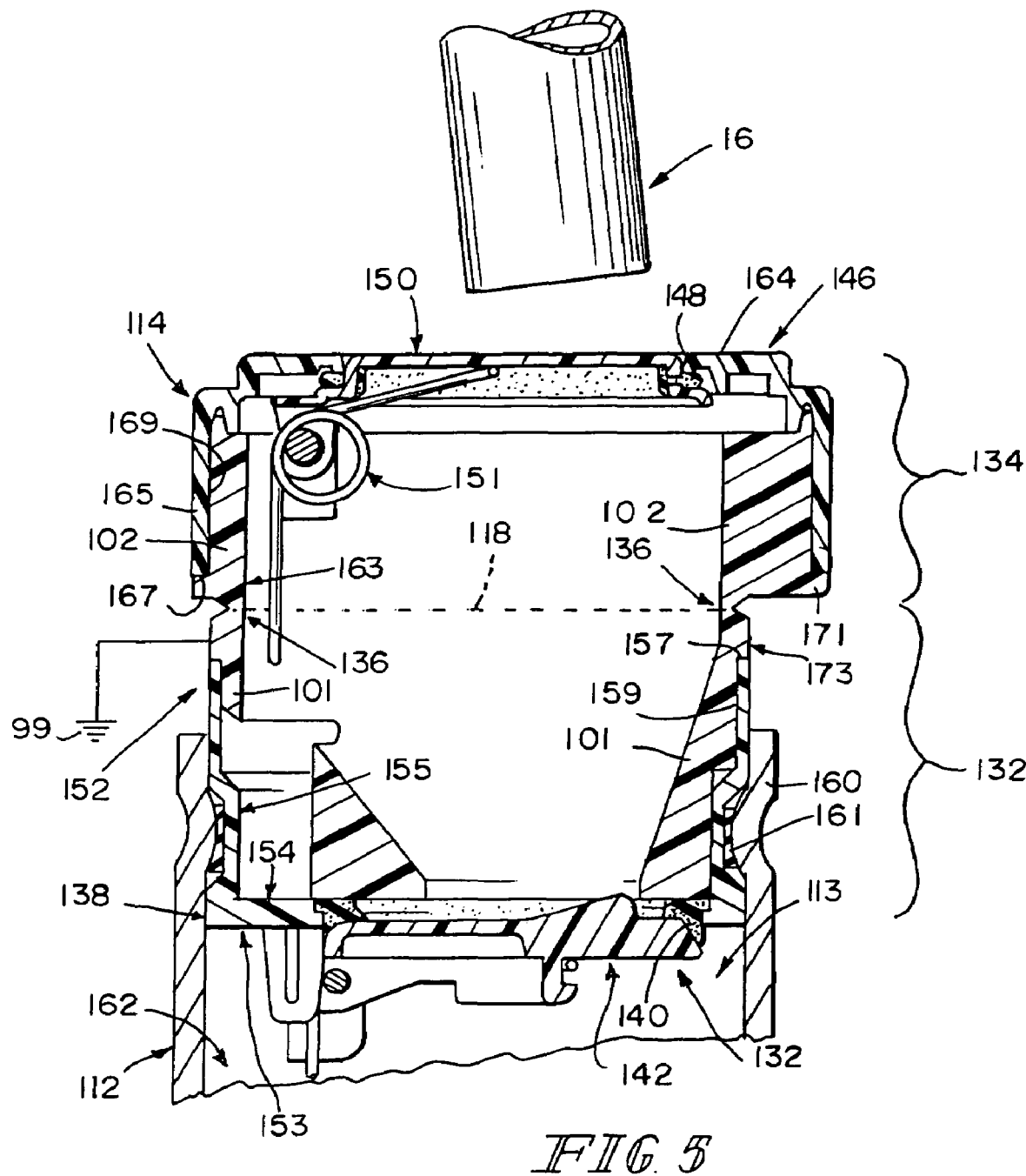
FIG. 5 is a sectional view of a filler neck closure unit in accordance with a second embodiment of the present disclosure, the filler neck closure unit including a base having a foundation coupled to an outer end of the filler neck and configured to support a pivotable flapper door normally closing a nozzle-receiving opening formed in the foundation and a tube having an inner end coupled to the foundation and an outer end joined to the inner end at a frangible, breakaway groove formed in the tube, the filler neck closure unit further including an external cover having a body coupled to the outer end of the tube and configured to support a pivotable outer appearance door normally closing a nozzle-receiving opening formed in a top wall of the cover.

Each of capless filler neck closure units 14, 114 is arranged normally to close an open mouth of filler neck 12 or 112 as suggested, for example, in FIGS. 2 and 5. Each of closure units 14, 114 is formed to include a frangible portion 36 or 136 that is designed to break in a controlled manner as suggested, for example, in FIGS. 4 and 7 so that an inner portion of closure unit 14 or 114 remains in place to close the open mouth of filler neck 12 or 112 even after an outer portion of closure unit 14 or 114 is hit hard by an external impact 20 and separated from filler neck 12 or 112.

As suggested in FIG. 2, closure unit 14 in accordance with a first embodiment of the present disclosure includes a barrier unit 32 and a breakaway unit 34. Closure unit 14 also includes a frangible portion 36 located between barrier and breakaway units 32, 34. Frangible portion 36 is characterized by a radially outwardly opening annular groove in an illustrative embodiment as suggested in FIG. 2.

Barrier unit 32 is coupled to filler neck 12 to close open mouth 13. Barrier unit 32 includes a foundation 38 that is coupled to filler neck 12 and formed to include an inner nozzle-receiving aperture 40. Barrier unit 32 also includes a flapper door 42 mounted for movement relative to foundation 38 to open and close inner nozzle-receiving aperture 40.

Breakaway unit 34 of closure unit 14 is arranged to lie apart from filler neck 12 as suggested in FIG. 2. Breakaway unit 34 includes a cover support 44, a cover 46 formed to include an outer nozzle-receiving aperture 48 and coupled to cover support 44, and an appearance door 50 mounted for movement relative to cover 46 to open and close outer nozzle-receiving aperture 48. A spring (not shown) is contemplated for yieldably urging appearance door 50 to assume a position closing aperture 48 as shown in FIG. 2.

Frangible portion 36 of closure unit 14 is arranged to interconnect barrier and breakaway units 32, 34. Frangible portion 36 is formed to fracture along fracture line 18 in response to an external impact 20 to breakaway unit 34 to allow separation of breakaway unit 34 from barrier unit 32 without separating barrier unit 32 from filler neck 12 so that barrier unit 32 remains in place to block unwanted discharge of liquid fuel and fuel vapor from filler neck 12 through mouth 13.

Capless filler neck closure unit 14 is adapted to be coupled to a filler neck 12 to close an inlet into a fluid-conducting passageway 62 formed in filler neck 12 and to receive a fuel-dispensing pump nozzle 16 during fuel tank refueling. In the illustrated embodiment, capless filler neck closure unit 14 includes a base 52 configured to provide a portion of barrier unit 32 and also a portion of breakaway unit 34. Base 52 includes a bottom wall 54 and flapper door 42 coupled to bottom wall 54 as shown in FIG. 2. Bottom wall 54 is formed to include an inner nozzle-receiving aperture 40 adapted to open into filler neck 12 when capless filler neck closure unit 14 is coupled to filler neck 12. Flapper door 42 is mounted for movement relative to bottom wall 54 to open and close inner nozzle-receiving aperture 40. Base 52 further includes an axially extending side wall 56 including an axially inner portion 58 coupled to bottom wall 54 and adapted to be coupled to filler neck 12, an axially outer portion defined by cover support 44 and coupled to cover 46 to align outer and inner nozzle-receiving apertures 48, 40 to define a nozzle-receiving passageway therebetween, and a frangible portion 36 separating axially inner and outer portions 58, 44 of axially extending side wall 56.

Fuel tank filler apparatus 10 further includes a filler neck 12 including an outer end 60 and a fluid-conducting passageway 62 having an inlet opening 13 in outer end 60. As suggested in FIGS. 2 and 4, axially inner portion 58 of side wall 56, bottom wall 54, and flapper door 42 cooperate to form a barrier unit 32 that mates with outer end 60 of filler neck 12 and closes inlet opening 13 into outer end 60 of filler neck 12. Cover 46 includes a top wall 64 formed to include outer nozzle-receiving aperture 48, an appearance door 50 mounted for movement relative to top wall 64 to open and close outer nozzle-receiving aperture 48, and an inner sleeve 66 arranged to extend downwardly from top wall 64 to mate with outer portion 44 of axially extending side wall 56 to form a breakaway unit 34 comprising cover 46 and axially outer portion 44 of side wall 56. Breakaway unit 34 is adapted to receive an external impact 20 and separate from axially inner portion 58 of side wall 56 upon breakage of frangible portion 36 in response to external impact 20 without separating barrier unit 32 from outer end 60 of filler neck 12.

In an illustrative embodiment, a monolithic member 53 made of a plastics material is formed to include bottom wall 54, axially inner and outer portions 58, 44 of side wall 56, and frangible portion 36 as shown best in FIG. 2. Axially inner portion 58 of side wall 56 includes a filler neck mount 70 comprising an inner mount ring 72 arranged to mate with an interior surface 74 of filler neck 12, an outer mount ring 76 arranged to mate with an exterior surface 78 of filler neck 12, and an annular web 80 interconnecting inner and outer mount rings 72, 76. Axially inner portion 58 of side wall 56 also includes an annular upstanding ridge 82 extending from filler neck mount 70 to frangible portion 36 of base 52. Monolithic member 53 of base 52 further includes a tab 84 appended to outer portion 44 of axially extending side wall 56 and arranged to extend into a notch 86 formed in inner sleeve 66 of cover 46 to retain cover 46 normally in a mounted position on outer portion 44 of axially extending side wall 56 of base 52 to establish breakaway unit 34. In an illustrative embodiment, a plurality of circumferentially spaced-apart notch/tab combinations are used.

In illustrative embodiments, filler neck mount 78 is spin-welded onto filler neck 12. However, it is within the scope of this disclosure to include any suitable structure or apparatus such as, for example, annular beads, threads, cams, or flanges for coupling base 52 of closure unit 14 to filler neck 12.

Cover 46 further includes an outer sleeve 88 coupled to top wall 64 and arranged to surround and lie in spaced-apart relation to inner sleeve 66. Inner sleeve 66 is arranged to surround outer portion 44 of axially extending side wall 56 and frangible portion 36. Inner sleeve 66 is formed to include one or more tab-receiving notch 86 opening toward outer portion 44 of axially extending side wall 56.

A pump nozzle 16 is adapted for insertion into nozzle-receiving opening 40 formed in base 52 so that fuel can be pumped into fuel tank 24 through filler neck 12. Bottom wall 54 of base 52 has an inner, funnel-shaped, nozzle-guiding surface 51 formed to define nozzle-receiving opening 40. Nozzle-guiding surface 51 facilitates insertion of pump nozzle 16 into filler neck 12 for refueling. Reference is hereby made to U.S. Pat. No. 6,446,826, which is incorporated by reference herein, for a more detailed description of a filler neck closure assembly. Reference is also made to U.S. Pat. No. 6,189,581, which is incorporated by reference herein, for a description of another suitable filler neck closure assembly.

Appearance door 50 is movable between a normally closed position, as shown in FIG. 2, and an opened position, shown in FIG. 3. When door 50 is in the normally closed position, entry of contaminant material including rocks, dirt, pebbles, and other debris into filler neck 12 through opening 48 formed in closure unit 14 is blocked. Cover 46 is dome-shaped to aid in the deflection of contamination by eliminating flat surfaces or depressions that may attract contaminants.

Base 52 includes four tabs 86 and dust cover 46 includes four respective notches 86 for receiving tabs 84 therein in order to snap-fit cover 46 onto base 52. In order to snap-fit cover 46 to base 52, a user must first place cover 46 over base 52 and then turn cover 46 approximately 90 degrees in order to lock tabs 84 within notches 86. Although four tabs 84 are provided, it is within the scope of this disclosure to include a base having any number of tabs and a cover having any number of respective notches. Further, it is within the scope of this disclosure to couple cover 46 to base 52 in any number of ways.

As mentioned above, appearance door 50 normally is positioned to lie in the closed position. In order to insert pump nozzle 16 into filler neck 12 so that fuel may be pumped into fuel tank 24, pressure or a downward force must be applied by pump nozzle 16 to door 50 in order to move door 50 from the closed to the opened position, as shown in FIG. 3. Once door 50 has been forced to the opened position by pump nozzle 16, pump nozzle 16 may be moved through nozzle-receiving aperture 40 of base 52 to urge flapper door 42 to an opened position as well. Once flapper door 42 is in the opened position, pump nozzle 16 may then be inserted into filler neck 12 in order to pump fuel into fuel tank 24.

As suggested in FIG. 5, closure unit 114 in accordance with a second embodiment of the present disclosure includes a barrier unit 132 and a breakaway unit 134. Closure unit 114 also includes a frangible portion 136 located between barrier and breakaway units 132, 134. Frangible portion 136 is characterized by a radially outwardly opening annular groove in an illustrative embodiment as suggested in FIG. 5.

Barrier unit 132 is coupled to filler neck 112 to close open mouth 113. Barrier unit 132 includes a foundation 138 that is coupled to filler neck 112 and arranged to extend through open mouth 113 and terminate in a location outside of filler neck 112. Barrier unit 132 also includes a support post 101 coupled to foundation 138 and located outside of filler neck 112 and a flapper door 142 mounted for movement relative to foundation 138 to open and close an inner nozzle-receiving aperture 140 formed in foundation 138.

Breakaway unit 134 of closure unit 114 is arranged to lie apart from filler neck 112. Breakaway unit 134 includes a cover support 102, a cover 146 formed to include an outer nozzle-receiving aperture 148 and coupled to cover support 102, and an appearance door 150 mounted for movement relative to cover 146 to open and close outer nozzle-receiving aperture 148. A spring 151 is provided for yieldably urging appearance door 150 to assume a position closing aperture 148 as shown in FIG. 5.

Frangible portion 136 of closure unit 114 is arranged to interconnect support post 101 and cover support 102. Frangible portion 136 is formed to fracture in response to an external impact 20 to breakaway unit 134 to allow separation of breakaway unit 134 from barrier unit 132 without separating barrier unit 132 from filler neck 112 so that barrier unit 132 remains in place to block unwanted discharge of liquid fuel and fuel vapor from filler neck 112 through mouth 113. In the illustrated embodiment of FIGS. 5-7, a monolithic member 173 made of a plastics material includes support post 101, frangible portion 136, and cover support 102.

Apparatus 110 further includes a filler neck 112 including an outer end 160 and a fluid-conducting passageway 162 having an inlet opening 113 in outer end 160. As suggested in FIG. 5, closure unit 114 includes a base 152 including a tube 163 formed to include frangible portion 136 and a barrier unit 132 mating with outer end 160 of filler neck 12 to close inlet opening 113 in outer end 160 of filler neck 112. A sealing ring 161 is interposed between outer end 160 and foundation 138 as suggested in FIG. 5. Barrier unit 132 comprises bottom wall 154, flapper door 142, and an upstanding pipe 155 coupled to bottom wall 154 and arranged to mate with outer end 160 of filler neck 112 and trap sealing ring 161 therebetween. Tube 163 further includes an inner end provided by support post 101 that is coupled to upstanding pipe 155 and an outer end provided by cover support 102 that is coupled to cover 146 and arranged to lie in spaced-apart relation to inner end 101 to locate frangible portion 136 therebetween.

Outer end 102 of tube 163 defines an axially outer portion of an axially extending side wall included in base 152. Upstanding pipe 155 of barrier unit 132 and inner end 101 of tube 163 cooperate to define an axially inner portion of the axially extending side wall included in base 152. As suggested in FIGS. 5 and 7, frangible portion 136 is provided in base 152 between axially outer portion 102 and axially inner portion 101.

A monolithic member 153 made of a plastics material is formed to include bottom wall 154 and upstanding pipe 155. Tube 163 is also monolithic and made of a plastics material and inner end 101 of tube 163 is fixed rigidly to upstanding pipe 155. Upstanding pipe 155 includes a top edge 157 and an interior wall 159 extending downwardly from top edge 157 as shown in FIG. 5. Inner end 101 of tube 163 includes a downwardly facing surface mating with top edge 157 and an exterior wall mating with interior wall 159 of upstanding pipe 155 and extending downwardly toward bottom wall 154 of barrier unit 132 as shown, for example, in FIG. 5. Upstanding pipe 155 includes an inner portion arranged to lie inside and mate with filler neck 112 and an outer portion arranged to lie outside filler neck 112 to locate tube 163 outside of filler neck 112.

Cover 146 includes a top wall 164 formed to include outer nozzle-receiving aperture 148, an appearance door 150 mounted for movement relative to top wall 164 to open and close outer nozzle-receiving aperture 148, and a cover sleeve 165 arranged to extend downwardly from top wall 164 to surround a portion of outer end 102 of tube 163. Cover sleeve 165 includes a bottom edge 167 and an interior wall 169 extending upwardly from bottom edge toward top wall 164. Outer end 102 of tube 163 includes an external wall mating with interior wall 169 of cover sleeve 165 and a radially outwardly extending flange 171 positioned to lie between exterior wall and frangible portion 136 and mate with bottom edge 167 of cover sleeve 165.

Each of cover 146 and tube 163 comprises an electrically conductive material (or coating) that is grounded to dissipate any electrostatic charge carried on a fuel-dispensing pump nozzle 16 moved to contact cover 146. During refueling, fuel-dispensing pump nozzle 16 will be moved to open appearance door 150 and flapper door 142 and extend into passageway 162 in filler neck 12 in a manner similar to that shown, for example, in FIG. 6. Pump nozzle 16 will be grounded to dissipate any electrostatic charge carried on pump nozzle 16 as soon as pump nozzle 16 contacts appearance door 150 or a shell (such as cover 146) arranged to surround appearance door 150 and included in closure unit 114. Such dissipation is due to the fact that cover 146, appearance door 150, tube 163, and spring 151 (and any other components in closure unit 114 needed to establish an electrically conductive path to ground) are made of an electrically conductive material such as metal, a conductive plastics material, or a substrate provided with an electrically conductive coating. Closure unit 114 can be coupled electrically to ground 99 in any suitable manner including, for example, through filler neck 112. It is also within the scope of this disclosure to couple closure unit 114 to ground in a similar manner.

The invention claimed is:

1. A fuel tank filler apparatus comprising
a capless filler neck closure unit adapted to be coupled to a filler neck to close an inlet into a fluid-conducting passageway formed in the filler neck and to receive a fuel-dispensing pump nozzle during fuel tank refueling, the capless filler neck closure unit including a cover formed to include an outer nozzle-receiving aperture and a base including a bottom wall formed to include an inner nozzle-receiving aperture adapted to open into the filler neck when the capless filler neck closure unit is coupled to the filler neck and a flapper door mounted for movement relative to the bottom wall to open and close the inner nozzle-receiving aperture, the base further including an axially extending side wall including an axially inner portion coupled to the bottom wall and adapted to be coupled to the filler neck, an axially outer portion coupled to the cover to align the outer and inner nozzle-receiving apertures to define a nozzle-receiving passageway therebetween, and a frangible portion separating the axially inner and outer portions of the axially extending side wall.

2. The apparatus of claim 1, further comprising a filler neck including an outer end and a fluid-conducting passageway having an inlet opening in the outer end and wherein the axially inner portion of the side wall, the bottom wall, and the flapper door cooperate to form a barrier unit that mates with the outer end of the filler neck and closes the inlet opening into the outer end of the filler neck, and the cover includes a top wall formed to include the outer nozzle-receiving aperture, an appearance door mounted for movement relative to the top wall to open and close the outer nozzle-receiving aperture, and an inner sleeve arranged to extend downwardly from the top wall to mate with the outer portion of the axially extending side wall to form a breakaway unit comprising the cover and the axially outer portion of the side wall, which breakaway unit is adapted to receive an external impact and separate from the axially inner portion of the side wall upon breakage of the frangible portion in response to the external impact without separating the barrier unit from the outer end of the filler neck.

3. The apparatus of claim 2, wherein a monolithic member made of a plastics material is formed to include the bottom wall, the axially inner and outer portions of the side wall, and the frangible portion.

4. The apparatus of claim 3, wherein the axially inner portion of the side wall includes a filler neck mount comprising an inner mount ring arranged to mate with an interior surface of the filler neck, an outer mount ring arranged to mate with an exterior surface of the filler neck, an annular web interconnecting the inner and outer mount rings, and an annular upstanding ridge extending from the filler neck mount to the frangible portion of the base.

5. The apparatus of claim 3, wherein the monolithic member further includes a tab appended to the outer portion of the axially extending side wall and arranged to extend into a notch formed in the inner sleeve of the cover to retain the cover normally in a mounted position on the outer portion of the axially extending side wall of the base to establish the breakaway unit.

6. The apparatus of claim 2, wherein the inner sleeve is arranged to surround the outer portion of the axially extending side wall and the frangible portion.

7. The apparatus of claim 6, wherein the inner sleeve is formed to include a notch opening toward the outer portion of the axially extending side wall and the base further includes a tab appended to the outer portion of the axially extending side wall and arranged to extend into the notch formed in the inner sleeve to retain the cover normally in a mounted position on the outer portion of the axially extending side wall of the base to establish the breakaway unit.

8. The apparatus of claim 2, wherein the inner sleeve is formed to include a notch opening toward the outer portion of the axially extending side wall and the base further includes a tab appended to the outer portion of the axially extending side wall and arranged to extend into the notch formed in the inner sleeve to retain the cover normally in a mounted position on the outer portion of the axially extending side wall of the base to establish the breakaway unit.

9. The apparatus of claim 2, wherein the cover further includes an outer sleeve coupled to the top wall and arranged to surround and lie in spaced-apart relation to the inner sleeve.

10. The apparatus of claim 2, wherein the axially inner portion of the side wall includes a filler neck mount comprising an inner mount ring arranged to mate with an interior surface of the filler neck, an outer mount ring arranged to mate with an exterior surface of the filler neck, an annular web interconnecting the inner and outer mount rings, and an annular upstanding ridge extending from the filler neck mount to the frangible portion of the base.

11. The apparatus of claim 1, further comprising a filler neck including an outer end and a fluid-conducting passageway having an inlet opening in the outer end and the base includes a tube including the frangible portion and a barrier unit mating with the outer end of the filler neck to close the inlet opening in the outer end of the filler neck, the barrier unit comprising the bottom wall, the flapper door, and an upstanding pipe coupled to the bottom wall and arranged to mate with the outer end of the filler neck, the tube further including an inner end coupled to the upstanding pipe and an outer end coupled to the cover and arranged to lie in spaced-apart relation to the inner end to locate the frangible portion therebetween, the outer end of the tube defining the axially outer portion of the axially extending side wall, and the upstanding pipe of the barrier unit and the inner end of the tube cooperating to define the axially inner portion of the axially extending side wall.

12. The apparatus of claim 11, wherein a monolithic member made of a plastics material is formed to include the bottom wall and the upstanding pipe.

13. The apparatus of claim 12, wherein the tube is monolithic and made of a plastics material and the inner end of the tube is fixed rigidly to the upstanding pipe.

14. The apparatus of claim 11, wherein the upstanding pipe includes a top edge and an interior wall extending downwardly from the top edge and the inner end of the tube includes a downwardly facing surface mating with the top edge and an exterior wall mating with the interior wall of the upstanding pipe and extending downwardly toward the bottom wall of the barrier unit.

15. The apparatus of claim 11, wherein the cover includes a top wall formed to include the outer nozzle-receiving aperture, an appearance door mounted for movement relative to the top wall to open and close the outer nozzle-receiving aperture, and a cover sleeve arranged to extend downwardly from the top wall to surround a portion of the outer end of the tube, the cover sleeve includes a bottom edge and an interior wall extending upwardly from the bottom edge toward the top wall, the outer end of the tube includes an exterior wall mating with the interior wall of the cover sleeve and a radially outwardly extending flange positioned to lie between the exterior wall and the frangible portion and mate with the bottom edge of the cover sleeve.

16. The apparatus of claim 11, wherein the upstanding pipe includes an inner portion arranged to lie inside and mate with the filler neck and an outer portion arranged to lie outside the filler neck to locate the tube outside of the filler neck.

17. The apparatus of claim 11, wherein each of the cover and tube comprises an electrically conductive material that is grounded to dissipate any electrostatic charge carried on a fuel-dispensing pump nozzle moved to contact the cover.

18. A fuel tank filler apparatus comprising
a filler neck having an open mouth,
a barrier unit coupled to the filler neck to close the open mouth, the barrier unit including a foundation coupled to the filler neck and formed to include an inner nozzle-receiving aperture and a flapper door mounted for movement relative to the foundation to open and close the inner nozzle-receiving aperture,
a breakaway unit lying apart from the filler neck and including a cover support, a cover formed to include an outer nozzle-receiving aperture and coupled to the cover support, and an appearance door mounted for movement relative to the cover to open and close the outer nozzle-receiving aperture, and
a frangible portion arranged to interconnect the barrier and breakaway units and formed to fracture in response to an external impact to the breakaway unit to allow separation of the breakaway unit from the barrier unit without separating the barrier unit from the filler neck.

19. A fuel tank filler apparatus comprising
a filler neck having an open mouth,
a barrier unit coupled to the filler neck to close the open mouth, the barrier unit including a foundation coupled to the filler neck and arranged to extend through the open mouth and terminate in a location outside of the filler neck, a support post coupled to the foundation and located outside of the filler neck, and a flapper door mounted for movement relative to the foundation to open and close an inner nozzle-receiving aperture formed in the foundation,
a breakaway unit lying apart from the filler neck and including a cover support, a cover formed to include an outer nozzle-receiving aperture and coupled to the cover support, and an appearance door mounted for movement relative to the cover to open and close the outer nozzle-receiving aperture, and
a frangible portion arranged to interconnect the support post and the cover support and formed to fracture in response to an external impact to the breakaway unit to allow separation of the breakaway unit from the barrier unit without separating the barrier unit from the filler neck.

20. The apparatus of claim 19, wherein a monolithic member made of a plastics material includes the support post, frangible portion, and cover support.

* * * * *